United States Patent
Chan (10) Patent No.: US 11,479,351 B2
(45) Date of Patent: Oct. 25, 2022

(54) AERIAL VEHICLE

(71) Applicant: ST ENGINEERING AEROSPACE LTD., Singapore (SG)

(72) Inventor: Keen Ian Chan, Paya Lebar (SG)

(73) Assignee: ST ENGINEERING AEROSPACE LTD., Paya Lebar (SG)

( * ) Notice: Subject to any disclaimer, the term of this patent is extended or adjusted under 35 U.S.C. 154(b) by 253 days.

(21) Appl. No.: 16/612,347

(22) PCT Filed: May 9, 2017

(86) PCT No.: PCT/SG2017/050241
§ 371 (c)(1),
(2) Date: Nov. 8, 2019

(87) PCT Pub. No.: WO2018/208220
PCT Pub. Date: Nov. 15, 2018

(65) Prior Publication Data
US 2020/0172238 A1 Jun. 4, 2020

(51) Int. Cl.
*B64C 29/02* (2006.01)
*B64F 5/10* (2017.01)
(Continued)

(52) U.S. Cl.
CPC .............. *B64C 29/02* (2013.01); *B64C 11/46* (2013.01); *B64C 39/08* (2013.01); *B64F 5/10* (2017.01)

(58) Field of Classification Search
CPC ......... B64C 29/00; B64C 29/02; B64C 39/08; B64C 3/32; B64C 27/16
See application file for complete search history.

(56) References Cited

U.S. PATENT DOCUMENTS 5,419,514 A 5/1995 Ducan
9,346,542 B2 * 5/2016 Leng ................. B64C 27/26
(Continued)

FOREIGN PATENT DOCUMENTS

CN 204642150 U 9/2015
CN 106218887 A 12/2016
(Continued)

OTHER PUBLICATIONS

Ryll M. et al., Modeling am Control of a Quadrotor UAV with Tilting Propellers, 2012 IEEE International Conference on Robotics and and Automation (ICRA). May 14, 2012, pp. 4606-4613 [Retrieved on Feb. 21, 2018] <DOI: 10.1109/ICRA.2012.6225129 >Whole document, especially Figures 1•2.
(Continued)

*Primary Examiner* — Timothy D Collins
*Assistant Examiner* — Eric Acosta
(74) *Attorney, Agent, or Firm* — Lewis Roca Rothgerber Christie LLP (57) ABSTRACT

An aerial vehicle may include a first wing structure. The aerial vehicle may further include a first propeller and a second propeller disposed along the first wing structure. The aerial vehicle may further include a second wing structure disposed to intersect the first wing structure to form a cross configuration. The aerial vehicle may further include a third propeller and a fourth propeller disposed along the second wing structure. In a hovering orientation of the aerial vehicle, respective propeller rotational axes of the first and second propellers may be angled off-vertical in respective planes which may be perpendicular to a transverse axis of the first wing structure, and respective propeller rotational axes of the third and fourth propellers may be angled off-vertical in respective planes which may be perpendicular to a transverse axis of the second wing structure.

21 Claims, 5 Drawing Sheets

(51) Int. Cl.
  *B64C 11/46* (2006.01)
  *B64C 39/08* (2006.01)

(56) References Cited

U.S. PATENT DOCUMENTS

| | | |
|---|---|---|
| 2005/0178879 A1 | 8/2005 | Mao |
| 2013/0105635 A1 | 5/2013 | Alzu'bi et al. |
| 2014/0217229 A1* | 8/2014 | Chan .................... B64C 39/024 244/6 |
| 2015/0014475 A1 | 1/2015 | Taylor et al. |
| 2016/0023755 A1 | 1/2016 | Elshafei et al. |
| 2016/0144957 A1 | 5/2016 | Claridge et al. |
| 2016/0325829 A1 | 11/2016 | Ahn et al. |

FOREIGN PATENT DOCUMENTS

| | | |
|---|---|---|
| CN | 106892094 A | 6/2017 |
| WO | WO 2013/048339 A1 | 4/2013 |
| WO | WO 2015/099603 A1 | 7/2015 |
| WO | WO 2016/013933 A1 | 1/2016 |

OTHER PUBLICATIONS

Bogdanowicz et al., Development of a Quad-Rotor Biplane MAV with Enhanced Roll Control Authority in Fixed Wing Mode, Presented at the AHS 71st Annual Forum, Virginia Beach, Virginia, May 5-7, 2015. Copyright © 2015 by the American Helicopter Society International, Inc. All rights reserved.

Extended European Search Report dated Jan. 13, 2021 for corresponding European Patent Application No. 17723536.3 (10 pages).

* cited by examiner

AERIAL VEHICLE

CROSS-REFERENCE TO RELATED APPLICATION(S)

This application is a National Phase Patent Application and claims the priority of International Application Number PCT/SG2017/050241, filed on May 9, 2017, the entire contents of which is incorporated herein by reference.

TECHNICAL FIELD

Embodiments generally relate to an aerial vehicle, a method of assembling an aerial vehicle and a kit of parts for assembling an aerial vehicle.

BACKGROUND

Aerial vehicle capable of Vertical Take-Off and Landing (VTOL), for example tail-sitter aircraft such as XFV-1 of the 1950s, typically uses the same set of flight controls for both vertical and horizontal flight and represents the most direct way of achieving transition flight. However, with the pilot facing upwards during vertical flight, making visual assessments, e.g. during landing, can be difficult.

Further, tail-sitter aircrafts have other technical issues. For example, they tend to be susceptible to toppling, e.g. when landing in a wind. This is due to a high centre of gravity relative to the size of the tail base. To address this issue, landing gears of wide span may be installed or span of the tail base may be enlarged to cover a wider area on the ground. These measures typically add weight and aerodynamic drag which in turn compromise the performance (e.g. cruise endurance) of the aircraft.

Another aerial vehicle capable of VTOL would be aircraft with tilt-wings or tilt-rotors configurations. These aircrafts typically remain horizontal during transition. Thus, these configurations would render the aircraft suitable for carrying passengers. However, aircraft with tilt-wings or tilt-rotors configurations would need separate sets of flight controls for helicopter-mode and airplane-mode flight, resulting in high complexity in their development and implementation.

On the other hand, unmanned aerial vehicle (UAV) or drones do not carry passengers or pilots. Hence passenger- and pilot-related limitations of aircraft capable of VTOL are not applicable to UAVs.

However, there are further issues related to the development of autonomous transition for UAV. A typical transition maneuver typically spans a wide range of airspeeds and angle-of-attack. The presence of variables which cover a wide range of values, when multiplied in combinations with the other variables, can potentially result in massive aerodynamic databases for adequate coverage of the transition envelope. This would incur significant effort and cost to generate by means such as wind tunnel testing, CFD etc., when developing autonomous transition. In addition, highly nonlinear aerodynamic characteristics and changes in stability characteristics over the high angle-of-attack range would need complex, non-linear control strategies and algorithms to be developed, further adding to the complexity of development efforts.

A known quad-rotor unmanned aerial vehicle is disclosed in PCT International Publication number WO2013/048339. The quad-rotor unmanned aerial vehicle described may be capable of Vertical Take-Off and Landing (VTOL) as well as transition between a vertical flight mode (or a helicopter-mode) and a horizontal flight mode (or an airplane-mode). However, an operational limitation of the quad-rotor unmanned aerial vehicle is that it has weak control authority in yaw during hovering or helicopter-mode flight, which is also the roll control in the airplane-mode flight. The yaw control during hovering may be relatively weaker than pitch or roll control during hovering, because pitch or roll may leverage on moment arm effects to enhance control power but yaw control may only use differential torque. Further, maneuverability in yaw may be limited or reduced by the large moment of inertia in yaw as a result of the wingspan, which is typically the longest dimension of the aircraft. The weak control authority in yaw during helicopter-mode (or roll during airplane-mode) tends to deteriorate the controllability of the aircraft, particularly when hovering in a crosswind, which is an important practical operating scenario.

Another known quad-rotor unmanned aerial vehicle is disclosed in PCT International Publication number WO2016/013933. The quad-rotor unmanned aerial vehicle includes a rotatable left and right wingtip sections on the main wing structure that are rotatable for improving roll control in horizontal flight mode and yaw control in vertical flight mode. However, rotating the left and right wingtip sections will require additional mechanisms which add to the aircraft system complexity, weight and cost. It also introduces additional failure modes, which compromises the reliability of the aircraft system. The additional rotation will also increase the number of control parameters thus increasing the complexity of controlling the unmanned aerial vehicle.

Another known VTOL is disclosed in US 2005/0178879. A single wing structure with pairs of propellers, one above and one below the single wing structure, at each of the opposing wing tips is suggested to be implemented with slight upward and downward angle from the horizontal for the propellers above and below the single wing structure respectively, for increasing effective pitch torque.

SUMMARY

According to various embodiments, there is provided an aerial vehicle. The aerial vehicle may include a first wing structure. The aerial vehicle may further include a first propeller and a second propeller disposed along the first wing structure. The aerial vehicle may further include a second wing structure disposed to intersect the first wing structure to form a cross configuration. The aerial vehicle may further include a third propeller and a fourth propeller disposed along the second wing structure. In a hovering orientation of the aerial vehicle, respective propeller rotational axes of the first and second propellers may be angled off-vertical in respective planes which may be perpendicular to a transverse axis of the first wing structure, and respective propeller rotational axes of the third and fourth propellers may be angled off-vertical in respective planes which may be perpendicular to a transverse axis of the second wing structure.

According to various embodiments, there is provided a method of assembling an aerial vehicle. The method may include providing a first wing structure. The method may further include providing a first propeller and a second propeller along the first wing structure. The method may further include providing a second wing structure to intersect the first wing structure to form a cross configuration. The method may further include providing a third propeller and a fourth propeller along the second wing structure. In a hovering orientation of the aerial vehicle, respective propeller rotational axes of the first and second propellers may be angled off-vertical in respective planes which may be perpendicular to a transverse axis of the first wing structure, and respective propeller rotational axes of the third and fourth propellers may be angled off-vertical in respective planes which may be perpendicular to a transverse axis of the second wing structure.

According to various embodiments, there is provided a kit for assembling an aerial vehicle. The kit may include a first wing structure. The kit may further include a first propeller and a second propeller adapted to be disposed along the first wing structure such that, in a hovering orientation of the aerial vehicle, respective propeller rotational axes of the first and second propellers may be angled off-vertical in respective planes which may be perpendicular to a transverse axis of the first wing structure. The kit may further include a second wing structure adapted to intersect the first wing structure to form a cross configuration. The kit may further include a third propeller and a fourth propeller adapted to be disposed along the second wing structure such that, in a hovering orientation of the aerial vehicle, respective propeller rotational axes of the third and fourth propellers may be angled off-vertical in respective planes which may be perpendicular to a transverse axis of the second wing structure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments of an aerial vehicle or an aircraft or an unmanned aircraft or an unmanned aerial vehicle have been provided to address at least some of the issues identified earlier.

Figure 1:
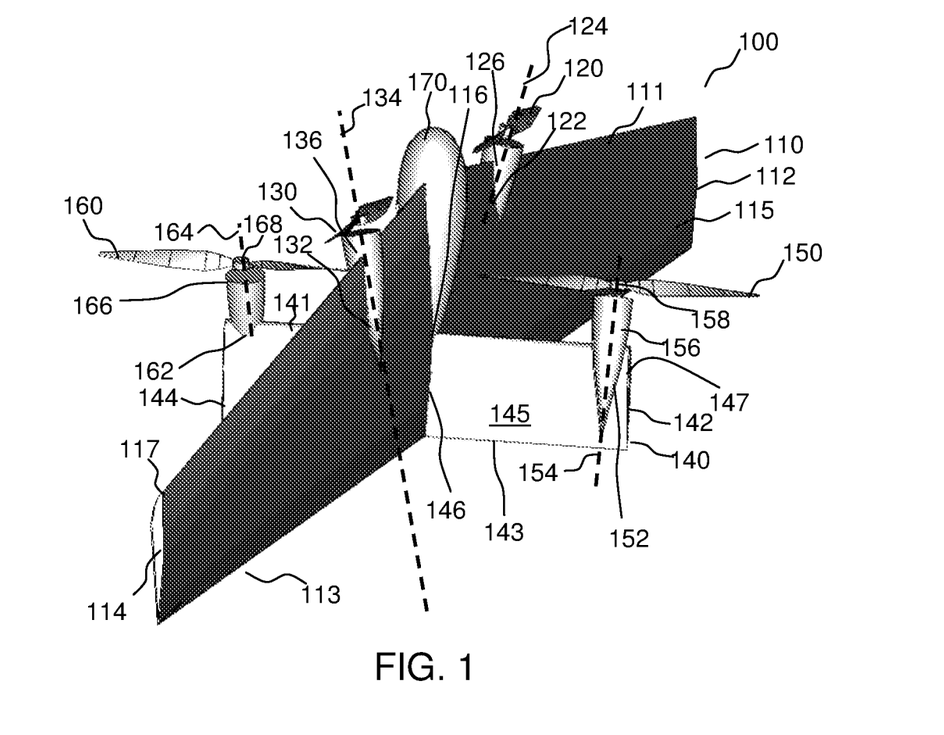
FIG. 1 shows an aerial vehicle in a vertical flight mode (or a helicopter-mode or hovering orientation) according to various embodiments.
Figure 2:
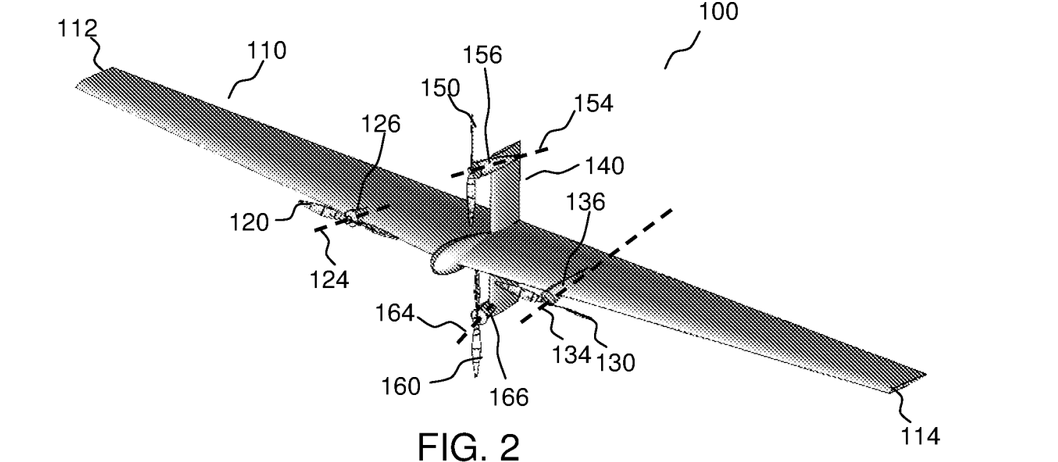
FIG. 2 shows the aerial vehicle of FIG. 1 in a horizontal flight mode (or an airplane-mode) according to various embodiments.

FIG. 1 shows an aerial vehicle 100 in a vertical flight mode (or a helicopter-mode or hovering orientation) according to various embodiments. FIG. 2 shows the aerial vehicle 100 of FIG. 1 in a horizontal flight mode (or an airplane-mode) according to various embodiments. As shown in FIG. 1 and FIG. 2, various embodiments of the aerial vehicle 100 may be a quad-rotor flying wing. Although FIG. 1 shows the aerial vehicle 100 in a vertical flight mode (or a helicopter-mode or hovering orientation), the aerial vehicle 100 may also sit on the ground for vertically taking off or landing in this orientation. Accordingly, the aerial vehicle 100 may not need additional weight or structure for landing gears. Shown in FIG. 2 is the aerial vehicle 100 in airplane mode orientation. As shown, the aerial vehicle 100 may be configured to incorporate a high aspect ratio monoplane wing for high cruise efficiency. According to various embodiments, the aerial vehicle 100 may be an aircraft, or an unmanned aircraft, or an unmanned aerial vehicle. According to various embodiments, the aerial vehicle 100 may be capable of vertical flight mode (or helicopter-mode or hovering orientation) and/or horizontal flight mode (or airplane-mode).

As shown in FIG. 1 and FIG. 2, the aerial vehicle 100 may include a first wing structure 110. The first wing structure 110 may be configured to provide lift when the aerial vehicle 100 is in the horizontal flight mode (or the airplane-mode). According to various embodiments, the first wing structure 110 may include an airfoil structure. According to various embodiments, the first wing structure 110 may include a rounded leading edge 111 and a sharp trailing edge 113. According to various embodiments, a first surface 115 of the first wing structure 110 and a second surface 117 of the first wing structure 110 may have symmetrical curvatures. According to various embodiments, the first surface 115 of the first wing structure 110 and the second surface 117 of the first wing structure 110 may have asymmetrical curvatures. According to various embodiments, the first wing structure 110 may have a high aspect ratio wherein the ratio of wingspan squared over wing area of the first wing structure 110 may be high such that the first wing structure 110 may be long and slender resulting in higher cruise efficiency, more efficient aerodynamics and lower induced drag coefficient. According to various embodiments, the first wing structure 110 may have a low aspect ratio such that the aerial vehicle 100 may meet a desired compactness requirement.

As shown, a wing planform of the first wing structure 110 of the aerial vehicle 110 may be tapered towards the respective wingtips 112, 114. Accordingly, the chord length of the first wing structure 110 may vary along the span of the first wing structure 110 and the chord length of the first wing structure 110 may narrow towards the respective wingtips 112, 114. According to various embodiments, the wing planform of the first wing structure 110 of the aerial vehicle 100 may include other geometrical configurations including but not limited to rectangular configuration, elliptical configuration, cranked kite configuration, or delta configuration.

The wing as seen from the front may also incorporate variations from a straight, horizontal wingspan including but not limited to dihedral, anhedral, gull-wing, or inverted gull-wing.

As shown, the aerial vehicle 100 may further include a first propeller 120 and a second propeller 130. The first propeller 120 and the second propeller 130 may be disposed along the first wing structure 110. Accordingly, the first propeller 120 may be disposed at a first position 122 along the first wing structure 110 and the second propeller 130 may be disposed at a second position 132 along the first wing structure 110. The first position 122 along the first wing structure 110 may be at a predetermined distance measured from a middle 116 of the first wing structure 110 towards a first wingtip 112. The second position 132 along the first wing structure 110 may be at a predetermined distance measured in an opposite direction from the middle 116 of the first wing structure 110 towards a second wingtip 114. According to various embodiments, a distance between the first position 122 and the middle 116 of the first wing structure 110 may be the same as a distance between the second position 132 and the middle 116 of the first wing structure 110.

According to various embodiments, the first propeller 120 and the second propeller 130 may be configured or orientated to rotate at a position ahead or forward of the leading edge 111 of the first wing structure 110 so as to work together to generate a thrust for moving the aerial vehicle 100 in a direction such that the leading edge 111 of the first wing structure 110 may cut through the air.

As shown in FIG. 1, the first propeller 120 and the second propeller 130 may be configured such that, in the hovering orientation of the aerial vehicle 100, a first propeller rotational axis 124 of the first propeller 120 and a second propeller rotational axis 134 of the second propeller 130 may be angled off-vertical. Further, the first propeller rotational axis 124 of the first propeller 120 may be angled off-vertical in a first plane which is at least substantially perpendicular to a transverse axis of the first wing structure 110. The second propeller rotational axis 134 of the second propeller 130 may be angled off-vertical in a second plane which is at least substantially perpendicular to the transverse axis of the first wing structure 110. The transverse axis of the first wing structure 110 may be an axis passing through the first wing structure 110 from wingtip 112 to wingtip 114. As shown, the first propeller rotational axis 124 and the second propeller rotational axis 134 may be angled off-vertical in opposite directions such that each of the first propeller 120 and the second propeller 130 may be orientated to cause a moment about the yaw axis in a same first moment direction.

According to various embodiments, the first propeller rotational axis 124 and the second propeller rotational axis 134 may be fixedly angled off-vertical in the respective planes. Accordingly, the first propeller 120 may be installed or mounted to the first wing structure 110 such that the first propeller rotational axis 124 may be fixed with respect to the first wing structure 110. The second propeller 120 may also be installed or mounted to the first wing structure 110 such that the second propeller rotational axis 134 may be fixed with respect to the first wing structure 110.

According to various other embodiments, the first propeller rotational axis 124 and the second propeller rotational axis 134 may be angled off-vertical in a same direction such that the first propeller 120 and the second propeller 130 may be orientated to cause opposing moments about the yaw axis when the aerial vehicle 100 is in the hovering orientation.

According to various embodiments, the first propeller rotational axis 124 and the second propeller rotational axis 134 may form at least substantially a first pair of skew lines. According to various embodiments, when the first propeller rotational axis 124 and the second propeller rotational axis 134 are angled off-vertical in a same direction, the first propeller rotational axis 124 and the second propeller rotational axis 134 may be at least substantially parallel to each other.

As shown, the aerial vehicle 100 may further include a second wing structure 140. According to various embodiments, the second wing structure 140 may include an airfoil structure. According to various embodiments, the second wing structure 140 may include a rounded leading edge 141 and a sharp trailing edge 143. According to various embodiments, a first surface 145 of the second wing structure 140 and a second surface 147 of the second wing structure 140 may have symmetrical curvatures. According to various embodiments, a planform of the second wing structure 140 of the aerial vehicle 100 may be rectangular such that the second wing structure 140 may include uniform cross section from one wingtip 142 to another wingtip 144. According to various embodiments, the planform of the second wing structure 140 may include other geometrical configurations including but not limited to tapered configuration, elliptical configuration, or delta configuration. According to various embodiments, the second wing structure 140 may be pylons or fins or the like.

According to various embodiments, the second wing structure 140 may intersect the first wing structure 110 such that the first wing structure 110 and the second wing structure 140 may form a cross configuration, or a "+"-configuration, or an orthogonal configuration. Accordingly, the first wing structure 110 and the second wing structure 140 may form a structure resembling a cross such that the first wing structure 110 may be a straight piece of the cross and the second wing structure 140 may be a transverse piece of the cross. Hence, the second wing structure 140 may be at least substantially perpendicular to the first wing structure 110 and vice versa. Thus, the second wing structure 140 may separate or divide the first wing structure 110 into two portions. Similarly, the first wing structure 110 may separate or divide the second wing structure 140 into two portions.

According to various embodiments, the second wing structure 140 may intersect the first wing structure 110 at the middle 116 of the first wing structure 110. Accordingly, the two portions of the first wing structure 110 separated by the second wing structure 140 may be equal portions. According to various embodiments, the two portions of the second wing structure 140 separated by the first wing structure 110 may also be equal portions.

According to various embodiments, the first wing structure 110 may include a single continuous structure. According to various embodiments, the second wing structure 140 may also include a single continuous structure and may be inserted into and through the first wing structure 110 such that the second wing structure 140 may divide or demarcate or separate the first wing structure 110 into two portions by passing through the first wing structure 110. According to various embodiments, the second wing structure 140 may include two separate parts coupled to the first wing structure 110 such that the two separate parts of the second wing structure 140 may be joined across the first wing structure 110 to divide or demarcate or separate the first wing structure 110 into two portions.

According to various embodiments, the second wing structure 140 may intersect the first wing structure 110 at a position along the first wing structure 110 in between the first propeller 120 and the second propeller 130. Accordingly, the first propeller 120 and the second propeller 130 may be disposed along different portions of the first wing structure 110 separated by the second wing structure 140. Hence, the first propeller 120 may be disposed along a portion of the first wing structure 110 on one side of the second wing structure 140 and the second propeller 130 may be disposed along another portion of the first wing structure 110 on another side of the second wing structure 140.

As shown in FIG. 1 and FIG. 2, the aerial vehicle 100 may further include a third propeller 150 and a fourth propeller 160 disposed along the second wing structure 140. Accordingly, the third propeller 150 may be disposed at a first position 152 along the second wing structure 140 and the fourth propeller 160 may be disposed at a second position 162 along the second wing structure 140. The first position 152 along the second wing structure 140 may be at a predetermined distance measured from a middle 146 of the second wing structure 140 towards the wingtip 142. The second position 162 along the second wing structure 140 may be at a predetermined distance measured in an opposite direction from the middle 146 of the second wing structure 140 towards the wingtip 144. According to various embodiments, a distance between the first position 152 and the middle 146 of the second wing structure 140 may be the same as a distance between the second position 162 and the middle 146 of the second wing structure 140.

According to various embodiments, the third propeller 150 and the fourth propeller 160 may be configured or orientated to rotate at a position ahead or forward of the leading edge 141 of the second wing structure 140 so as to work together to generate a thrust for moving the aerial vehicle 100 in a direction such that the leading edge 141 of the second wing structure 140 may cut through the air.

As shown in FIG. 1, the third propeller 150 and the fourth propeller 160 may be configured such that, in the hovering orientation of the aerial vehicle 100, a third propeller rotational axis 154 of the third propeller 150 and a fourth propeller rotational axis 164 of the fourth propeller 160 may be angled off-vertical. Further, the third propeller rotational axis 154 of the third propeller 150 may be angled off-vertical in a third plane which is at least substantially perpendicular to a transverse axis of the second wing structure 140. The fourth propeller rotational axis 164 of the fourth propeller 160 may be angled off-vertical in a fourth plane which is at least substantially perpendicular to the transverse axis of the second wing structure 140. The transverse axis of the second wing structure 140 may be an axis passing through the second wing structure 140 from wingtip 142 to wingtip 144. As shown, the third propeller rotational axis 154 and the fourth propeller rotational axis 164 may be angled off-vertical in opposite directions such that each of the third propeller 150 and the fourth propeller 160 may be orientated to cause a moment about the yaw axis in a same second moment direction. The second moment direction may be opposite the first moment direction.

According to various embodiments, the third propeller rotational axis 154 and the fourth propeller rotational axis 164 may be fixedly angled off-vertical in the respective planes. Accordingly, the third propeller 150 may be installed or mounted to the second wing structure 140 such that the third propeller rotational axis 154 may be fixed with respect to the second wing structure 140. The fourth propeller 160 may also be installed or mounted to the second wing structure 140 such that the fourth propeller rotational axis 164 may be fixed with respect to the second wing structure 140.

According to various other embodiments, the third propeller rotational axis 154 and the fourth propeller rotational axis 164 may be angled off-vertical in a same direction such that the third propeller 150 and the fourth propeller 160 may be orientated to cause opposing moments about the yaw axis when the aerial vehicle 100 is in the hovering orientation.

According to various embodiments, the third propeller rotational axis 154 and the fourth propeller rotational axis 164 may form at least substantially a second pair of skew lines. According to various embodiments, when the third propeller rotational axis 154 and the fourth propeller rotational axis 164 are angled off-vertical in a same direction, the third propeller rotational axis 154 and the fourth propeller rotational axis 164 may be at least substantially parallel to each other.

According to various embodiments, the third propeller rotational axis 154 may be angled off-vertical such that the third propeller rotational axis 154 may converge, or intersect, or cross the first propeller rotational axis 124. According to various embodiments, the fourth propeller rotational axis 164 may also be angled off-vertical such that the forth propeller rotational axis 164 may converge, or intersect, or cross the second propeller rotational axis 134.

According to various embodiments, the third propeller 150 and the fourth propeller 160 may be disposed along different portions of the second wing structure 140 separated by the first wing structure 110. Accordingly, the first wing structure 110 may intersect the second wing structure 140 at a position along the second wing structure 140 in between the third propeller 150 and the fourth propeller 160. Hence, the third propeller 150 may be disposed along a portion of the second wing structure 140 on one side of the first wing structure 110 and the fourth propeller 160 may be disposed along another portion of the second wing structure 140 on another side of the first wing structure 110.

According to various embodiments, the aerial vehicle 100 may be free of flight control surfaces. Accordingly, the aerial vehicle 100 may be free of one or more or a combination of ailerons, elevators, rudders, spoilers, flaps, slats, or air brakes. According to various embodiments, the first wing structure 110 and the second wing structure 140 of the aerial vehicle 100 may be free of flight control surfaces.

According to various embodiments, the aerial vehicle 100 may further include a fuselage 170 at the middle 116 of the first wing structure 110. The fuselage 170 may be blended with the first wing structure 110 at the middle 116 of the first wing structure 110. Accordingly, the aerial vehicle 100 may be free of clear dividing line between the first wing structure 110 and the fuselage 170. Hence, the first wing structure 110 may be smoothly blended with the fuselage 170 and a transition between the first wing structure 110 and the fuselage 170 may be free of abrupt edges.

According to various embodiments, the aerial vehicle 100 may be free of tail boom or may be tailless. Accordingly, the aerial vehicle 100 may be free of tail assembly or boom extending from a rear of the fuselage 170.

According to various embodiments, a portion of a trailing edge 113 of the first wing structure 110 and a portion of a trailing edge 143 of the second wing structure 140 may be aligned and contained in a same plane for contacting a ground. According to various other embodiments, the first wing structure 110 may have protruding structures jutting out from the trailing edge 113 and the second wing structure 140 may have protruding structures jutting out from the trailing edge 143. The tips of the protruding structures of the trailing edge 113 and the trailing edge 143 may be contained in a plane for contacting with a ground. Accordingly, the aerial vehicle 100 may be orientated to sit on the ground, e.g. before take-off or after landing, with the aligned portion of a trailing edge 113 of the first wing structure 110 and aligned portion of a trailing edge 143 of the second wing structure 140 flat against the ground or with the protruding portions of the trailing edge 113 and the trailing edge 143 lying in contact with the ground. Hence, the aerial vehicle 100 may vertically take-off and land in the sitting orientation.

Figure 3:
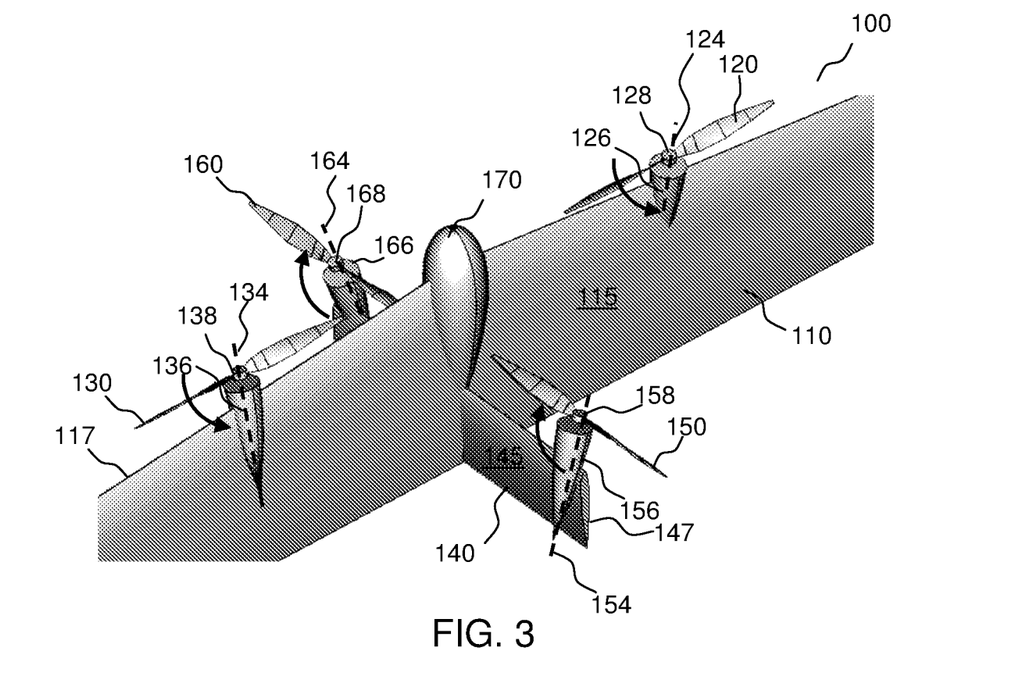
FIG. 3 shows an enlarged view of the aerial vehicle of FIG. 1 in the vertical flight mode (or a helicopter-mode or hovering orientation) according to various embodiments.
Figure 4:
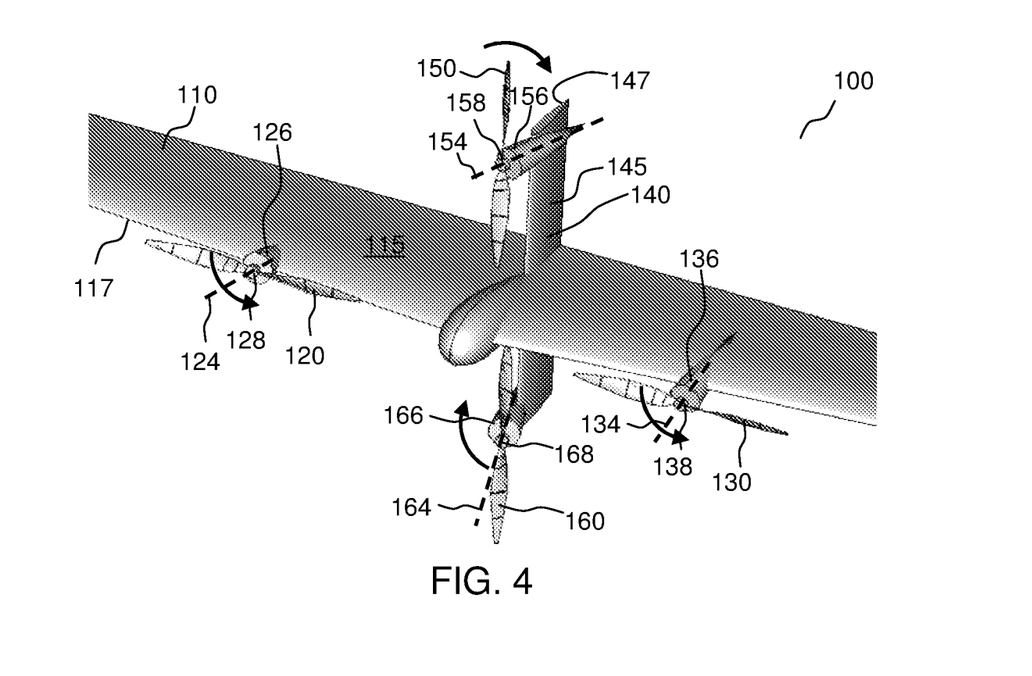
FIG. 4 shows an enlarged view of the aerial vehicle of FIG. 1 in the horizontal flight mode (or an airplane-mode) according to various embodiments.

FIG. 3 shows an enlarged view of the aerial vehicle 100 in the vertical flight mode (or the helicopter-mode or hovering orientation) according to various embodiments. FIG. 4 shows an enlarged view of the aerial vehicle 100 in the horizontal flight mode (or the airplane-mode) according to various embodiments. According to various embodiments, in the hovering orientation (or the helicopter-mode) of the aerial vehicle 100, the first propeller rotational axis 124, the second propeller rotational axis 134, the third propeller rotational axis 154 and the fourth propeller rotational axis 164 may be angled off-vertical such that each of the first propeller 120, the second propeller 130, the third propeller 150, and the fourth propeller 160 may be orientated to cause a moment about a yaw axis of the aerial vehicle 100 in the hovering orientation.

As shown in FIG. 3 and FIG. 4, the aerial vehicle 100 may include the pair of motors 126, 136 on the first wing structure 110. The pair of motors 126, 136 on the first wing structure 110 may be installed with equal and opposite tilts. According to various embodiments, the aerial vehicle 100 may include the pair of motors 156, 166 on the second wing structure 140. The pair of motors 156, 166 on the second wing structure 140 may also be installed with equal and opposite tilts. Accordingly, as shown in FIG. 3, when the aerial vehicle 100 is in the hovering orientation, the first propeller rotational axis 124 and the second propeller rotational axis 134 may be angled off-vertical in opposite directions such that each of the first propeller 120 and the second propeller 130 may be orientated to cause a moment about the yaw axis in a same first moment direction. Further, the third propeller rotational axis 154 and the fourth propeller rotational axis 164 may be angled off-vertical in opposite directions such that each of the third propeller 150 and the fourth propeller 160 may be orientated to cause a moment about the yaw axis in a same second moment direction. The second moment direction may be opposite of the first moment direction.

According to various other embodiments, the pair of motors 126, 136 on the first wing structure 110 may be installed with equal and same direction tilt (not shown) such that, when the aerial vehicle 100 is in the hovering orientation, the first propeller rotational axis 124 and the second propeller rotational axis 134 may be angled off-vertical in a same direction. The pair of motors 156, 166 on the second wing structure 140 may also be installed with equal and same direction tilt (not shown) such that, when the aerial vehicle 100 is in the hovering orientation, the third propeller rotational axis 154 and the fourth propeller rotational axis 164 may be angled off-vertical in a same direction.

According to various embodiments, the tilt angle for the pair of motors 126, 136 on the first wing structure 110 need not be equal to that of the pair of motors 156, 166 on the second wing structure 140. Accordingly, each of the first propeller rotational axis 124 and the second propeller rotational axis 134 may be angled off-vertical with a first angular magnitude, and each of the third propeller rotational axis 154 and the fourth propeller rotational axis 164 may be angled off-vertical with a second angular magnitude, wherein the first angular magnitude may be different from the second angular magnitude.

According to various embodiments, the spacing between the two motors 126, 136 on the first wing structure 110 may not be equal to the spacing between the two motors 156, 166 on the second wing structure 140. Accordingly, each of the first propeller 120 and the second propeller 130 along the first wing structure 110 may be spaced apart from the second wing structure 140 by a first distance, and each of the third propeller 150 and the fourth propeller 160 along the second wing structure 140 may be spaced apart from the first wing structure 110 by a second distance, wherein the first distance may be different from the second distance.

According to various embodiments, the first propeller 120 may be directly coupled to the first motor 126, the second propeller 130 may be directly coupled to the second motor 136, the third propeller 150 may be directly coupled to the third motor 156 and the fourth propeller 160 may be directly coupled to the fourth motor 166. Accordingly, when the aerial vehicle 100 is at equilibrium condition at hover, the yaw moment due to the combination of tilt angle and spacing for the pair of motors 126, 136 on the first wing structure 110 may be equal and opposite to that of the pair of motors 156, 166 on the second wing structure 140. Similarly, when the aerial vehicle 100 is in the airplane-mode, the same may apply for the airplane-mode roll moments.

According to various embodiments, the combination of tilted installations and spacings of the motors 126, 136, 156, 166 with propellers 120, 130, 150, 160 may produce enhancements in yaw control power in helicopter-mode, and roll control power in airplane-mode.

Shown in FIG. 4 are the directions of propeller rotations, looking from the front of the aerial vehicle 100 in the airplane-mode. According to various embodiments, each of the first propeller 120 and the second propeller 130 may be configured to rotate in a first rotational direction. Accordingly, the first propeller 120 and the second propeller 130 may rotate together in a same direction either clockwise or counter-clockwise. According to various embodiments, each of the third propeller 150 and the fourth propeller 160 may be configured to rotate in a second rotational direction. Accordingly, the third propeller 150 and the fourth propeller 160 may rotate together in a same direction either clockwise or a counter-clockwise. According to various embodiments, the second rotational direction may be opposite of the first rotational direction.

According to various other embodiments, the first propeller 120 and the second propeller 130 on the first wing structure 110 may be configured to rotate in opposing rotational directions. The third propeller 150 and the fourth propeller 160 on the second wing structure 140 may be configured to rotate in opposing rotational directions. According to various embodiments, when the first propeller rotational axis 124 and the second propeller rotational axis 134 are angled off in a same direction, the first propeller 120 and the second propeller 130 may be configured to rotate in opposite rotational directions. Further, when the third propeller rotational axis 154 and the fourth propeller rotational axis 164 are angled off in a same direction, the third propeller 150 and the fourth propeller 160 may be configured to rotate in opposite rotational directions.

As shown in FIG. 4, the first propeller 120 and the second propeller 130 on the first wing structure 110 may rotate counter-clockwise, while the third propeller 150 and the fourth propeller 160 may rotate clockwise. The '+' configuration or orientation of the propellers 120, 130, 150, 160, when seen from the front of the aerial vehicle 100, may enable the usual quad-rotor controls in helicopter-mode to be directly translated into the usual roll, pitch and yaw controls of airplane-mode.

According to various embodiments, the flight control principle of the aerial vehicle 100 in the airplane-mode flight may be established such that pitch may be controlled by differential thrust between the third propeller 150 and the fourth propeller 160 on the second wing structure 140; yaw (which becomes roll in helicopter-mode flight or hovering orientation) may be controlled by differential thrust between the first propeller 120 and the second propeller 130 on the first wing structure 110; roll (which becomes yaw in helicopter-mode flight or hovering orientation) may be controlled by differential thrust between the pair of propellers 120, 130 on the first wing structure 110 and the pair of propellers 150, 160 on the second wing structure.

Accordingly, pitch, yaw and roll controls may be decoupled, and only one set of flight control effectors may be used for both the vertical flight mode (or the helicopter-mode or hovering orientation) and the horizontal flight mode (or the airplane-mode). In addition, no additional control surfaces or tilting mechanisms may be required. The above features may result in a distinct simplification of developing a transition-capable runway-independent aircraft.

According to various embodiments, the aerial vehicle 100 may be configured to have low centre of gravity. The features and configurations for an inherently low centre of gravity position may be shown in FIG. 1. As shown, a base of the aerial vehicle 100 may be inherently wide relative to the low centre of gravity. This may improve the aerial vehicle's robustness to toppling in situations including but not limited to ground handling, landing in a wind, or rolling ship decks. Other features of the aerial vehicle 100 for low centre of gravity may include: no tail boom; fuselage may be blended into the first wing structure and may not extend significantly above the first wing structure; and the second wing structure for the third propeller 150 and the fourth propeller 160 may be configured to align or be positioned at the ground. Accordingly, the second wing structure may also support the aerial vehicle 100 on the ground, resulting in no need for additional landing gears. An additional function of the second wing structure may be to provide directional stability in airplane-mode flight.

Previously, it was described that differential thrust between the pair of propellers 120, 130 on the first wing structure 110 and the pair of propellers 150, 160 on the second wing structure may lead to differential torque between these pairs, and thereby a yaw control moment when applied in helicopter-mode or hovering orientation.

According to various embodiments, the pair of motors 126, 136 for the pair of propellers 120, 130 on the first wing structure 110 and the pair of motors 156, 166 for the pair of propellers 150, 160 on the second wing structure 140 may be installed at or configured with differential tilt. Accordingly, when in the hovering orientation, for each pair of propellers turning in the same direction (either the pair of propellers 120, 130 on the first wing structure 110 or the pair of propellers 150, 160 on the second wing structure 140), a natural tendency to yaw in the opposite direction may be generated. The respective pair of motors may be installed with differential tilt as to add to the natural yaw tendency.

Referring to FIG. 3, as an example with the pair of propellers 120, 130 on the first wing structure 110, the rotation of the pair of propellers 120, 130 may be counter-clockwise as seen from the top in the hovering orientation. This may produce a natural tendency to yaw in the clockwise direction. The respective pair of motors 126, 136 may be installed with differential tilt so as to add to the natural tendency to yaw clockwise. For example, the motor 126 may be tilted or inclined from the first surface 115 of the first wing structure 110 and the motor 136 may be tilted or inclined from the second surface 117 of the first wing structure 110. When the thrust of the pair of propellers 120, 130 on the first wing structure 110 is increased to produce clockwise yaw control moment, it can be seen that the differential tilt of the pair of propellers 120, 130 on the first wing structure 110 adds to the clockwise yaw control moment. Vice versa for the pair of propellers 150, 160 on the second wing structure 140. The rotation of the pair of propellers 150, 160 may be clockwise as seen from the top. This may produce a natural tendency to yaw in the counter-clockwise direction. The respective pair of motors 156, 166 may be installed with differential tilt so as to add to the natural tendency to yaw counter-clockwise. For example, the motor 156 may be tilted or inclined from the second surface 147 of the second wing structure 140 and the motor 166 may be tilted or inclined from the first surface 145 of the first wing structure 110.

According to various embodiments, the differential tilt of the pair of propellers 120, 130 on the first wing structure 110 may not be the same as that of the pair of propellers 150, 160 on the second wing structure 140. According to various embodiments, the spacing between the pair of motors, which provides the moment arm to operate with the differential tilt, also may not be the same for the pair of propellers 120, 130 on the first wing structure 110 and the pair of propellers 150, 160 on the second wing structure 140. According to various embodiments, when the aerial vehicle 100 is at equilibrium condition at hover, the yaw moment due to the combination of tilt angle and spacing for the pair of propellers 120, 130 on the first wing structure 110 may be equal and opposite to the yaw moment due to the pair of propellers 150, 160 on the second wing structure 140. Accordingly, the first propeller 120, the second propeller 130 the third propeller 150 and the fourth propeller 160 may be configured such that, when the aerial vehicle 100 is hovering in an equilibrium condition, the first propeller 120 and the second propeller 130 may generate a combined moment about the yaw axis in the first moment direction which is equal to a combined moment about the yaw axis in the second moment direction generated by the third propeller 150 and the fourth propeller 160.

According to various embodiments, the first propeller 120, the second propeller 130, the third propeller 150 and the fourth propeller 160 may be configured such that, when the aerial vehicle 100 is hovering to generate a yaw movement, the first propeller 120 and the second propeller 130 may generate a combined moment about the yaw axis in the first moment direction which is different from a combined moment about the yaw axis in the second moment direction generated by the third propeller 150 and the fourth propeller 160.

The above describes the relationship between the tilt angle and spacing of the pair of propellers 120, 130 on the first wing structure 110 with those of the pair of propellers 150, 160 on the second wing structure 140. The same may be applied for airplane-mode roll moments when the aerial vehicle 100 is in the airplane-mode.

According to various embodiments, apart from simple adapters to install the motors 126, 136, 156, 166 at a tilt angle, the boost in yaw control power may be achieved without using additional motors, mechanisms, actuators or devices. Hence, various embodiments provided a cost-effective technique for enhancing controllability, particularly when hovering in a cross-wind.

According to various embodiments, the aerial vehicle 100 may include at least one pair of propellers 120, 130 on the first wing structure 110. The aerial vehicle 100 may include at least one pair of propellers 150, 160 on the second wing structure 140. According to various embodiments, the aerial vehicle 100 may include two or more pairs of propellers on the first wing structure 110. The aerial vehicle may also include two or more pairs of propellers on the second wing structure 140. According to various embodiments, torque between the subsequent pair of propellers may be balanced. For example, each subsequent pair of propellers on the respective first wing structure 110 and the second wing structure 140 may be rotating in opposite directions.

According to various embodiments, there may be provided a method of assembling an aerial vehicle. The method may include providing the various components of the aerial vehicle 100 as described herein and may further include configuring the various components according to the aerial vehicle 100 as described herein.

According to various embodiments, there may be provided a kit of parts for assembling an aerial vehicle. The kit may include the various parts adapted or configured to form the aerial vehicle 100 as described herein.

According to various embodiments, the aerial vehicle may transit from the vertical flight mode (or the helicopter-mode or hovering orientation) to the horizontal flight mode (or the airplane-mode) using a vertical climb followed by a circular maneuver. The circular maneuver may be typical of that used by airplanes in aerobatic displays, and only involves linear aerodynamics Throughout the transition maneuver, angle-of-attacks are within the linear, pre-stall range. There may be no requirement to deal with the characteristics of complex, non-linear high angle-of-attack aerodynamics, and the complex change in stability characteristics during the development of an aerodynamic model for autonomous transition. Furthermore, as the transition uses only a narrow range of angle-of-attack and flight speed, the size of the aerodynamic database needed for adequate coverage of the transition envelope may be very significantly reduced, along with the cost and effort needed to generate it. These may result in distinct reductions in the high complexity of aerodynamic modeling for autonomous transition development.

Figure 5:
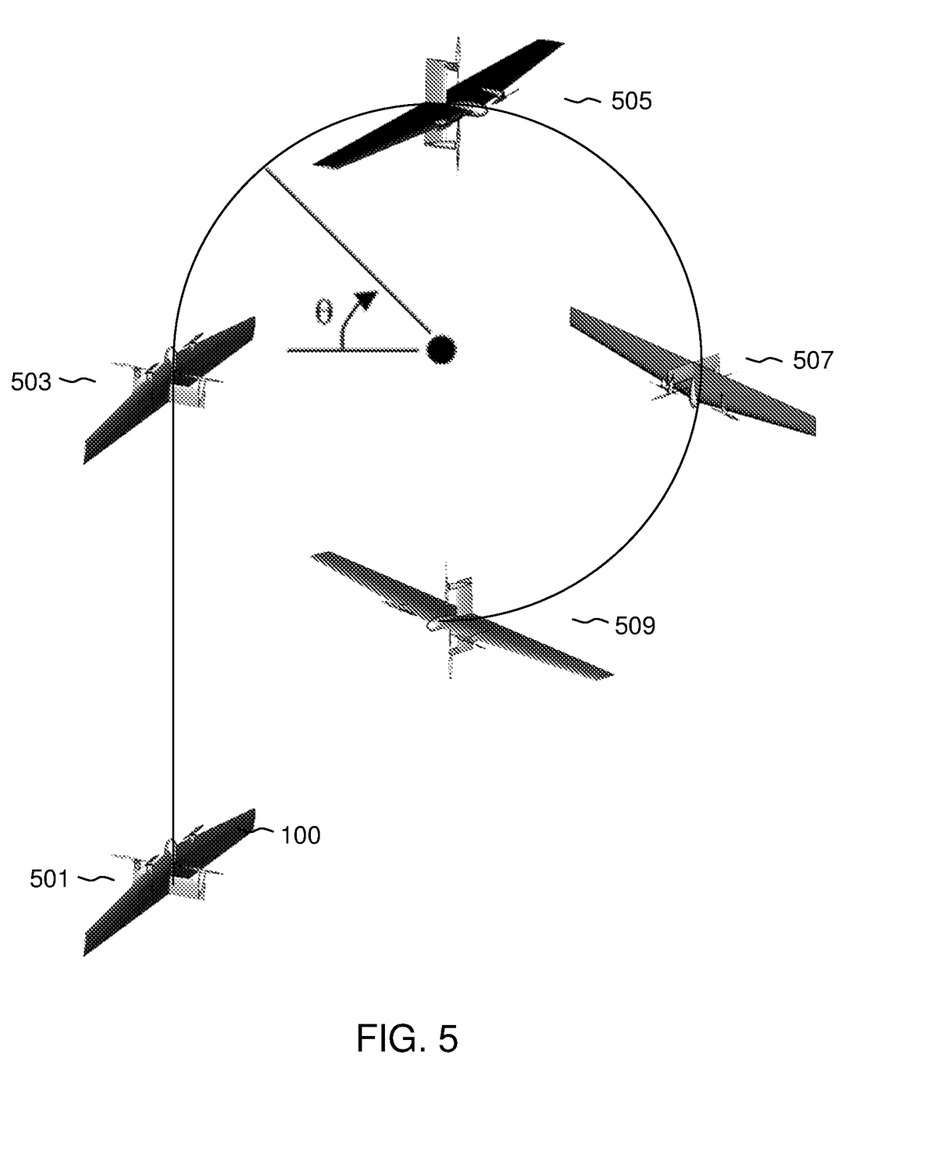
FIG. 5 shows a schematic diagram of a transition maneuver of the aerial vehicle of FIG. 1 according to various embodiments.

FIG. 5 shows a schematic diagram of a transition maneuver of the aerial vehicle 100 according to various embodiments. As shown, the transition maneuver may include five stages. In stage 501, the aerial vehicle 100 may takeoff vertically. In stage 503, the aerial vehicle 100 may reach at least stall speed, may develop aerodynamic lift in the radially inward direction, and may initiate a circular maneuver. In stage 505, the aerial vehicle 100 may transit to inverted flight. In stage 507, the aerial vehicle 100 may transit into downward flight. In stage 509, the aerial vehicle 100 may transit into normal airplane-mode flight. Referring to FIG. 5, the power requirements may be most severe at stage 503, which may involve vertically climbing flight. The powerplant of the aerial vehicle 100 may have to be sized to provide adequate power to move through this stage. According to various embodiments, the aerial vehicle 100 may include commercially available fuel cells, or a hybrid fuel cell system. A hybrid fuel system may include lithium-polymer batteries providing power for the more severe vertical and transition flight phases, following which the fuel cell may kick in for airplane mode cruise flight.

In the following, an example is described, which illustrates the method for determining the maximum power at stage 503. In this example, climb to $V_{stall}$ (thus lift coefficient $C_L = C_{Lmax}$) may be used. The method may also be used for climb to speeds higher than $V_{stall}$ ($C_L < C_{Lmax}$).

From F=ma, the left-hand side represents the net upward force given by

Thrust minus Weight minus Aerodynamic Drag

Thrust is a required value to be determined. Weight is known. Aerodynamic drag can, for example, conservatively use the maximum value which occurs at $V_{stall}$ ($½*\rho*V_{stall}^2*S*(C_D$ corresponding to $C_{Lmax}$)). This may ensure some over-sizing, and thereby margin of safety, of the thrust required. Accounting for aerodynamic drag in this simplified manner may tend to result in thrust required which may be about 10% more than that which omits aerodynamic drag. Alternatively, the aerodynamic drag may be expressed in terms of a time-varying dynamic pressure and lift coefficient. The increased complexity, although more exact, does not seem to be warranted, as aerodynamic drag may not be a significant contributor to thrust required. Hence, the former simpler method for accounting for aerodynamic drag may be used in this description.

For the right-hand side (ma), mass is known. Acceleration can be determined by specifying a safe climb altitude H at which $V_{stall}$ is reached. Kinematics of uniformly accelerated motion would give $$a = V_{stall}^2/(2H)$$

The required thrust to reach $V_{stall}$ in a vertical climb to altitude H can now be determined, since weight, aerodynamic drag and acceleration are now all known.

Knowing the thrust required at $V_{stall}$, then for a given propeller, the required propeller rpm and power can be determined, for example, from the propeller performance tables.

The looping circular maneuver at various points is described by θ, as illustrated in FIG. 5. The lift coefficient $C_L$ as a function of θ can be determined from Newton's Second Law applied in the radial direction.

Consider a general position along the circular flight path, described by θ in FIG. 5.

Taking F=ma in the radial direction, the general equation in terms of θ is:

Aerodynamic lift (radially inwards, $=q*S*C_L)+W*\sin θ=(m*V^2)/R$ $$qSC_L + W\sin θ = \frac{mV^2}{R}$$

On the left-hand side, the first term represents the aerodynamic lift acting radially inwards. The second term is the radial component of the weight. The right-hand side is the product of mass and radial acceleration.

The radius of turn R may be determined at the beginning of the maneuver when θ=0. At this point, only the aerodynamic lift force is used to initiate the circular flight path. Also, velocity=$V_{stall}$ and $C_L = C_{Lmax}$.

At other points of the circular flight path, $0° < θ < 180°$ (between stage 503 and stage 507 in FIG. 5), the weight now has a radial component that also contributes to the radial acceleration. The aerodynamic lift force can be reduced from the initial value at θ=0°, and thus over the range $0° < θ < 180°$, $C_L < C_{Lmax}$, which is the regime for linear aerodynamics.

After stage 507, the radial component of weight subtracts from that of the aerodynamic force, gradually reducing the radial acceleration to zero at stage 509, where level flight proceeds from there.

Figure 6:
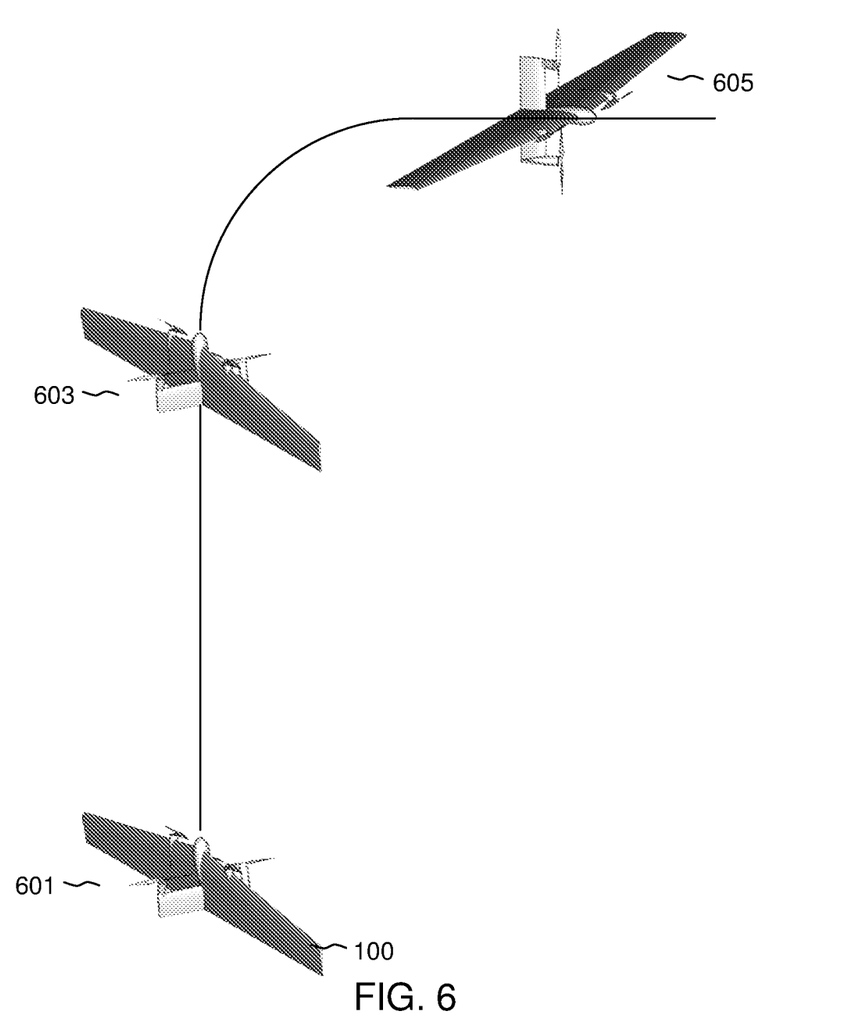
FIG. 6 shows a schematic diagram of another variation of a transition maneuver of the aerial vehicle of FIG. 1 according to various embodiments.

FIG. 6 shows a schematic diagram of another variation of circular maneuver of the aerial vehicle 100 according to various embodiments. As shown, the transition maneuver may include three stages. In stage 601, the aerial vehicle 100 may takeoff vertically. In stage 603, the aerial vehicle 100 may reach at least stall speed, may develop aerodynamic lift in the radially inward direction, and may initiates circular maneuver. In stage 605, the aerial vehicle 100 may transit into normal airplane-mode flight. The main difference from the maneuver of FIG. 5 is that in stage 603, a negative, rather than positive (as in stage 503 of FIG. 5), angle-of-attack may be needed to produce the radially inward force to initiate the circular maneuver.

The analysis to obtain $C_L$ versus $\theta$ would be the same as before, with the values of $C_{Lmax}$ and $V_{stall}$ corresponding to negative angle-of-attack. It would also illustrate that $C_L$ remains in the linear range.

As negative angle-of-attack is used to initiate the maneuver at stage 603 of FIG. 6, the force that can be produced is generally smaller than the previous example which used positive angle-of-attack, since the magnitude of negative $C_{Lmax}$ is usually smaller than that of positive $C_{Lmax}$. This may result in the radius of the maneuver being larger than that of FIG. 5.

Figure 7:
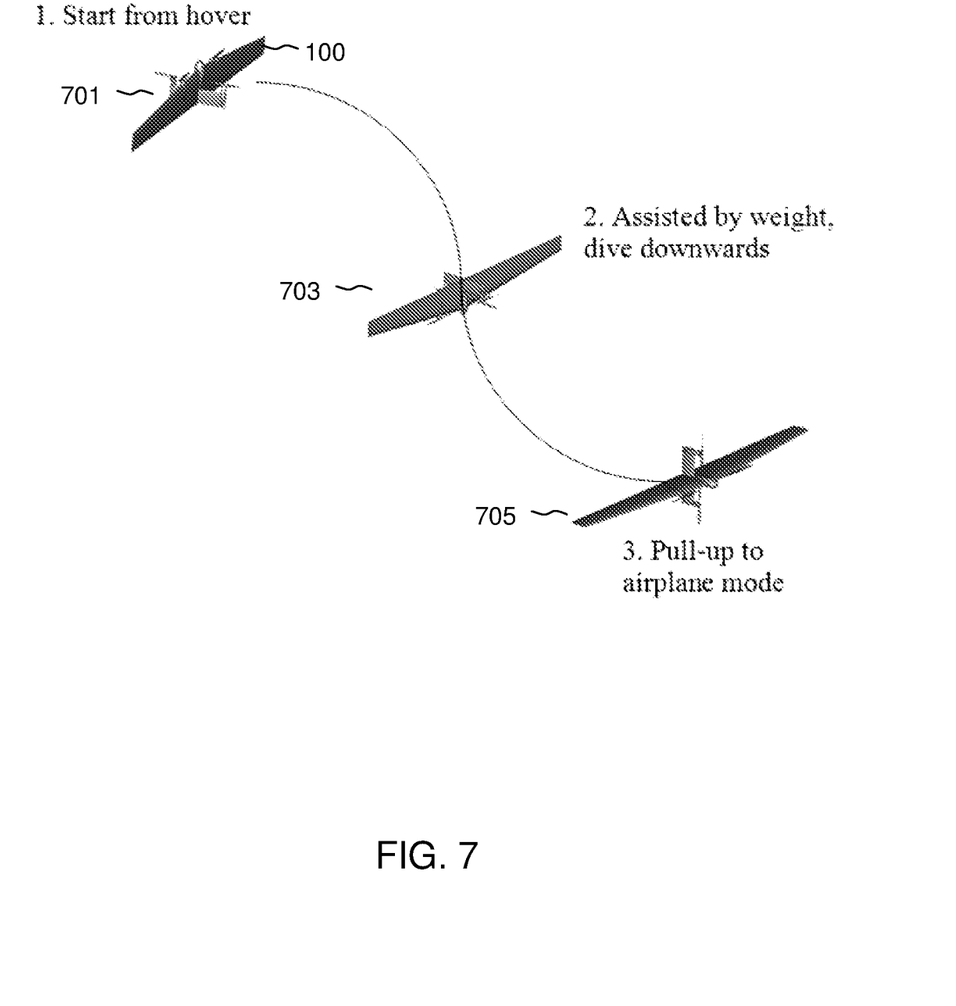
FIG. 7 shows a schematic diagram of yet another variation of transition maneuver of the aerial vehicle of FIG. 1 according to various embodiments.

FIG. 7 shows a schematic diagram of yet another variation of circular maneuver of the aerial vehicle 100 according to various embodiments. As shown, the transition maneuver may include three stages. In stage 701, the aerial vehicle 100 may be hovering in the helicopter-mode. In stage 703, the aerial vehicle 100 may be assisted by weight and may dive downwards. In stage 705, the aerial vehicle 100 may pull up from the dive to transit into normal airplane-mode flight. The main difference from the maneuvers of FIG. 5 and FIG. 6 is that the high power requirements for vertical climb to at least stall speed to initiate the transition maneuver may no longer be needed. The aerial vehicle 100 may only need to be in static hover at the start of the maneuver. This may reduce the size and weight of the powerplants of the aerial vehicle 100.

According to various embodiments, there may be provided an aerial vehicle. The aerial vehicle may include a first wing structure. The aerial vehicle may further include a first propeller and a second propeller disposed along the first wing structure. The aerial vehicle may also include a second wing structure disposed to intersect the first wing structure to form a cross configuration. The aerial vehicle may further include a third propeller and a fourth propeller disposed along the second wing structure. In a hovering orientation of the aerial vehicle, respective propeller rotational axes of the first and second propellers may be angled off-vertical in respective planes which may be perpendicular to a transverse axis of the first wing structure, and respective propeller rotational axes of the third and fourth propellers may be angled off-vertical in respective planes which may be perpendicular to a transverse axis of the second wing structure.

According to various embodiments, the respective propeller rotational axes of the first and second propellers may be angled off-vertical in opposite directions such that each of the first and the second propellers may be orientated to cause a moment about the yaw axis in a same first moment direction. Further, the respective propeller rotational axes of the third and fourth propellers may be angled off-vertical in opposite directions such that each of the third and the fourth propellers may be orientated to cause a moment about the yaw axis in a same second moment direction. According to various embodiments, the first moment direction may be opposite the second moment direction.

According to various embodiments, the respective propeller rotational axes of the first and second propellers may be angled off-vertical in a same direction such that the first and the second propellers may be orientated to cause opposing moment about the yaw axis. Further the respective propeller rotational axes of the third and fourth propellers may be angled off-vertical in a same directions such that the third and fourth propellers may be orientated to cause opposing moments about the yaw axis in opposite moment directions.

According to various embodiments, the propeller rotational axes of the first and second propellers may be at least substantially parallel to each other.

According to various embodiments, the propeller rotational axes of the third and fourth propellers may be at least substantially parallel to each other.

According to various embodiments, the first propeller, the second propeller, the third propeller and the fourth propeller may be configured such that, when the aerial vehicle is hovering to generate a yaw movement, the first and second propellers may generate a combined moment about the yaw axis in a first combined moment direction which may be different from a combined moment about the yaw axis in a second combined moment direction generated by the third and fourth propellers. According to various embodiments, the first combined moment direction may be opposite of the second combined moment direction.

According to various embodiments, the first propeller, the second propeller, the third propeller and the fourth propeller may be configured such that, when the aerial vehicle is hovering in an equilibrium condition, the first and second propellers may generate a combined moment about the yaw axis in a first combined moment direction which is equal to a combined moment about the yaw axis in a second combined moment direction generated by the third and fourth propellers. According to various embodiments, the first combined moment direction may be opposite of the second combined moment direction.

According to various embodiments, respective propeller rotational axes of the first and second propellers may be angled off-vertical with a first angular magnitude, and respective propeller rotational axes of the third and fourth propellers may be angled off-vertical with a second angular magnitude. According to various embodiments, the first angular magnitude may be different from the second angular magnitude. According to various embodiments, the first angular magnitude may be equal to the second angular magnitude.

According to various embodiments, the first and second propellers may be configured to rotate in a first rotational direction, and the third and fourth propellers may be configured to rotate in a second rotational direction. According to various embodiments, the second rotational direction may be opposite of the first rotational direction.

According to various embodiments, respective first and second propeller along the first wing structure may be spaced apart from the second wing structure by a first distance, and respective third and fourth propellers along the second wing structure may be spaced apart from the first wing structure by a second distance. According to various embodiments, the first distance may be different from the second distance. According to various embodiments, the first distance may be equal to the second distance.

According to various embodiments, the aerial vehicle may be free of flight control surfaces.

According to various embodiments, the aerial vehicle may further include a fuselage blended with the first wing structure at a middle of the first wing structure.

According to various embodiments, the aerial vehicle may be free of tail boom.

According to various embodiments, a portion of a trailing edge of the first wing structure and a portion of a trailing edge of the second wing structure may be aligned and contained in a same plane for contacting a ground.

According to various embodiments, the first wing structure may include protruding portions jutting out from a trailing edge of the first wing structure and the second wing structure may include protruding portions jutting out from a trailing edge of the second wing structure, and respective tips of the protruding portions of the first and second wing structures may be configured to support the aerial vehicle on a ground when the aerial vehicle is in a hovering orientation.

According to various embodiments, the aerial vehicle may include two or more pairs of propellers disposed along the first wing structure which may be configured such that a torque between subsequent pair of propellers may be balanced.

According to various embodiments, the aerial vehicle may include two or more pairs of propellers disposed along the second wing structure which may be configured such that a torque between subsequent pair of propellers may be balanced.

According to various embodiments, there may be provided a method of assembling an aerial vehicle. The method may include providing a first wing structure. The method may further include providing a first propeller and a second propeller along the first wing structure. The method may also include providing a second wing structure to intersect the first wing structure to form a cross configuration. The method may further include providing a third propeller and a fourth propeller along the second wing structure. In a hovering orientation of the aerial vehicle, respective propeller rotational axes of the first and second propellers may be angled off-vertical in respective planes which may be perpendicular to a transverse axis of the first wing structure, and respective propeller rotational axes of the third and fourth propellers may be angled off-vertical in respective planes which may be perpendicular to a transverse axis of the second wing structure.

According to various embodiments, the method may further include configuring the aerial vehicle as described herein.

According to various embodiments, there is provided a kit for assembling an aerial vehicle. The kit may include a first wing structure. The kit may further include a first propeller and a second propeller adapted to be disposed along the first wing structure such that, in a hovering orientation of the aerial vehicle, respective propeller rotational axes of the first and second propellers may be angled off-vertical in respective planes which may be perpendicular to a transverse axis of the first wing structure. The kit may further include a second wing structure adapted to intersect the first wing structure to form a cross configuration. The kit may further include a third propeller and a fourth propeller adapted to be disposed along the second wing structure such that, in a hovering orientation of the aerial vehicle, respective propeller rotational axes of the third and fourth propellers may be angled off-vertical in respective planes which may be perpendicular to a transverse axis of the second wing structure.

According to various embodiments, the first wing structure of the kit may include a fuselage blended with the first wing structure at a middle of the first wing structure.

According to various embodiments, respective parts of the kit may be configured to form the aerial vehicle as described herein.

Various embodiments have provided an aerial vehicle that have addressed some technical issues of a tailsitter aircraft relating to a high centre of gravity, and potentially high cost and complexity of developing the aerodynamic model for autonomous transition development. Various embodiments have provided an aerial vehicle that may retain the advantages of tailsitters, addressed their technical issues and leveraged on recent technological developments in the stabilization of quadrotor aircraft. Various embodiments have provided an aerial vehicle that may address the weak yaw control power in helicopter-mode or hovering flight (which becomes roll control in airplane-mode flight) of the tailsitter. Various embodiments have provided an aerial vehicle with enhanced hovering or vertical landing capability during crosswind conditions, which are important operational maneuvers. Various embodiments have provided an aerial vehicle with enhanced yaw control power by installing the motors with differential tilt angles. Various embodiments have provided a method or a technique to improve yaw control power that involves practically no additional mechanical complexity, and is hence a cost-effective means for enhancing yaw control power. Various embodiments have provided an aerial vehicle with enhanced control power in yaw without having to install additional mechanisms or being subjected to additional complexity and reliability problems.

Various embodiments have provided an aerial vehicle that may retain the advantages of tail-sitters, incorporate additional features which address the technical issues of tail-sitter, have enhanced control power, particularly for hovering in a crosswind, and leverage on recent technological developments. Various embodiments have provided an aerial vehicle that may not require launch or recovery equipment, runways, or tilting mechanisms. Various embodiments have provided an aerial vehicle that may have a single set of flight controls, same controls concept in vertical and horizontal flight, and decoupled flight controls in roll, pitch and yaw, which represent distinct reductions in high complexity over tilt-rotor and tilt-wing aircraft. Various embodiments have provided an aerial vehicle that may have inherently low centre of gravity position for stable ground handling, landing in a wind, or on rolling ship decks. This may address the susceptibility to toppling found in tail-sitters. Various embodiments have provided an aerial vehicle that may have redundancy in case of power plant failure. Various embodiments have provided an aerial vehicle configured to accomplish transition using only the linear range of angle-of-attack. This may result in a distinct reduction in high cost, effort and complexity in development of autonomous transition. The size (and cost to generate it) of the aerodynamic database for adequate coverage of the transition envelope may be greatly reduced. This may also render unnecessary the characterization and analysis of the highly non-linear and complex aerodynamics which occur at the high angle-of-attack region, or the development of complex algorithms to achieve autonomous control over this region. Various embodiments have provided an aerial vehicle that may have options for high endurance power plants (e.g. fuel cells, heavy fuel engines etc.).

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. An aerial vehicle comprising a first wing structure;
a first propeller and a second propeller disposed along the first wing structure;
a second wing structure disposed to intersect the first wing structure to form a cross configuration; and
a third propeller and a fourth propeller disposed along the second wing structure,
wherein the first wing structure is configured to provide lift when the aerial vehicle is in a horizontal flight mode,
wherein, in a hovering orientation of the aerial vehicle, respective propeller rotational axes of the first and second propellers are fixedly angled off-vertical in respective planes which are perpendicular to a transverse axis of the first wing structure, and wherein respective propeller rotational axes of the third and fourth propellers are fixedly angled off-vertical in respective planes which are perpendicular to a transverse axis of the second wing structure.

2. The aerial vehicle as claimed in claim 1,
wherein the respective propeller rotational axes of the first and second propellers are angled off-vertical in opposite directions such that each of the first and the second propellers is orientated to cause a moment about the yaw axis in a same first moment direction,
wherein the respective propeller rotational axes of the third and fourth propellers are angled off-vertical in opposite directions such that each of the third and the fourth propellers are orientated to cause a moment about the yaw axis in a same second moment direction,
wherein the first moment direction is opposite the second moment direction.

3. The aerial vehicle as claimed in claim 1,
wherein the respective propeller rotational axes of the first and second propellers are angled off-vertical in a same direction such that the first and the second propellers are orientated to cause opposing moment about the yaw axis,
wherein the respective propeller rotational axes of the third and fourth propellers are angled off-vertical in a same direction such that the third and fourth propellers are orientated to cause opposing moments about the yaw axis in opposite moment directions.

4. The aerial vehicle as claimed in claim 3, wherein the propeller rotational axes of the first and second propellers are at least substantially parallel to each other and/or wherein the propeller rotational axes of the third and fourth propellers are at least substantially parallel to each other.

5. The aerial vehicle as claimed in claim 2, wherein the first propeller, the second propeller, the third propeller and the fourth propeller are configured such that, when the aerial vehicle is hovering to generate a yaw movement, the first and second propellers generate a combined moment about the yaw axis in a first combined moment direction which is different from a combined moment about the yaw axis in a second combined moment direction generated by the third and fourth propellers, wherein the first combined moment direction is opposite of the second combined moment direction.

6. The aerial vehicle as claimed in claim 2, wherein the first propeller, the second propeller, the third propeller and the fourth propeller are configured such that, when the aerial vehicle is hovering in an equilibrium condition, the first and second propellers generate a combined moment about the yaw axis in a first combined moment direction which is equal to a combined moment about the yaw axis in a second combined moment direction generated by the third and fourth propellers, wherein the first combined moment direction is opposite of the second combined moment direction.

7. The aerial vehicle as claimed in claim 2, wherein respective propeller rotational axes of the first and second propellers are angled off-vertical with a first angular magnitude, and wherein respective propeller rotational axes of the third and fourth propellers are angled off-vertical with a second angular magnitude.

8. The aerial vehicle as claimed in claim 7, wherein the first angular magnitude is different from the second angular magnitude or wherein the first angular magnitude is equal to the second angular magnitude.

9. The aerial vehicle as claimed in claim 1, wherein the first and second propellers are configured to rotate in a first rotational direction, and wherein the third and fourth propellers are configured to rotate in a second rotational direction, the second rotational direction being opposite of the first rotational direction.

10. The aerial vehicle as claimed in claim 1, wherein respective first and second propeller along the first wing structure are spaced apart from the second wing structure by a first distance, and wherein respective third and fourth propellers along the second wing structure are spaced apart from the first wing structure by a second distance.

11. The aerial vehicle as claimed in claim 10, wherein the first distance is different from the second distance or wherein the first distance is equal to the second distance.

12. The aerial vehicle as claimed in claim 1, wherein the aerial vehicle is free of flight control surfaces.

13. The aerial vehicle as claimed in claim 1, further comprising a fuselage blended with the first wing structure at a middle of the first wing structure.

14. The aerial vehicle as claimed in claim 1, wherein the aerial vehicle is free of tail boom.

15. The aerial vehicle as claimed in claim 1, wherein a portion of a trailing edge of the first wing structure and a portion of a trailing edge of the second wing structure are aligned and contained in a same plane for contacting a ground.

16. The aerial vehicle as claimed in claim 1, wherein the first wing structure comprises protruding portions jutting out from a trailing edge of the first wing structure and the second wing structure comprises protruding portions jutting out from a trailing edge of the second wing structure, and wherein respective tips of the protruding portions of the first and second wing structures are configured to support the aerial vehicle on a ground when the aerial vehicle is in a hovering orientation.

17. The aerial vehicle as claimed in claim 1, wherein the aerial vehicle comprises two or more pairs of propellers disposed along the first wing structure which are configured such that a torque between subsequent pair of propellers is balanced.

18. The aerial vehicle as claimed in claim 1, wherein the aerial vehicle comprises two or more pairs of propellers disposed along the second wing structure which are configured such that a torque between subsequent pair of propellers is balanced.

19. A method of assembling an aerial vehicle, the method comprising:
providing a first wing structure;
providing a first propeller and a second propeller along the first wing structure;
providing a second wing structure to intersect the first wing structure to form a cross configuration; and
providing a third propeller and a fourth propeller along the second wing structure,
wherein the first wing structure is configured to provide lift when the aerial vehicle is in a horizontal flight mode, and
wherein, in a hovering orientation of the aerial vehicle, respective propeller rotational axes of the first and second propellers are fixedly angled off-vertical in respective planes which are perpendicular to a transverse axis of the first wing structure, and wherein respective propeller rotational axes of the third and fourth propellers are fixedly angled off-vertical in respective planes which are perpendicular to a transverse axis of the second wing structure.

20. A kit for assembling an aerial vehicle, the kit comprising:
a first wing structure;
a first propeller and a second propeller adapted to be disposed along the first wing structure such that, in a hovering orientation of the aerial vehicle, respective propeller rotational axes of the first and second propellers are fixedly angled off-vertical in respective planes which are perpendicular to a transverse axis of the first wing structure;
a second wing structure adapted to intersect the first wing structure to form a cross configuration;
wherein the first wing structure is configured to provide lift when the aerial vehicle is in a horizontal flight mode, and
a third propeller and a fourth propeller adapted to be disposed along the second wing structure such that, in a hovering orientation of the aerial vehicle, respective propeller rotational axes of the third and fourth propellers are fixedly angled off-vertical in respective planes which are perpendicular to a transverse axis of the second wing structure.

21. The kit as claimed in claim 20, wherein the first wing structure comprises a fuselage blended with the first wing structure at a middle of the first wing structure and/or wherein the respective parts of the kit are configured to form the aerial vehicle.

* * * * *